United States Patent
Lee

(10) Patent No.: US 6,658,270 B1
(45) Date of Patent: Dec. 2, 2003

(54) DISPLAYER-EMBEDDED CELLULAR PHONE BATTERY

(76) Inventor: Chang-Jung Lee, 2F, No. 23-3, Lane 8, Tien Mu E. Rd., Taipei City (TW)

( * ) Notice: Subject to any disclaimer, the term of this patent is extended or adjusted under 35 U.S.C. 154(b) by 497 days.

(21) Appl. No.: 09/640,994

(22) Filed: Aug. 18, 2000

(51) Int. Cl.[7] .............................................. H04B 17/00
(52) U.S. Cl. ..................... 455/566; 455/572; 455/550.1
(58) Field of Search ....................... 455/90, 560, 550.1, 455/572, 573, 557, 567; 345/204, 205, 206; 340/7.55, 7.56; 320/132, 107, FOR 205, FOR 232, 246

(56) References Cited

U.S. PATENT DOCUMENTS 4,856,088 A * 8/1989 Oliwa et al. ................ 455/349
6,051,957 A * 4/2000 Klein ......................... 320/132
6,115,618 A * 9/2000 Lebby et al. ................ 455/566

* cited by examiner

*Primary Examiner*—Nguyen T. Vo
*Assistant Examiner*—Kamran Afshar
(74) *Attorney, Agent, or Firm*—Apex Juris, pllc; Tracy M Heims

(57) ABSTRACT

This invention relates to a displayer-embedded cellular phone battery, which makes use of its back plate to display images like pictures, text and symbols. This invention works with a cellular phone set and is composed of a receiver, a controller, a display driver, a displayer and a battery. This invention provides the power for the cellular phone set. The phone battery also provides the necessary power for the embedded displayer of this invention and the phone battery is both rechargeable and replaceable. The messages could be displayed from the internal preset picture/text/symbol through the internal displayer driver and monitor; while receiving a phone call, the messages also could be displayed through an internal receiver, a displayer driver and monitor to achieve the result for different and animated entire figure.

7 Claims, 4 Drawing Sheets

DISPLAYER-EMBEDDED CELLULAR PHONE BATTERY

BACKGROUND OF THE INVENTION

1. Field of the invention

This invention relates to a displayer-embedded cellular phone battery, more specifically, a cellular phone battery which use its back plate to display messages such as pictures, text and symbols, the messages displayed are either from the internal preset picture/text/symbol with respect displayer driver, or from a receiver with displayer driver, the message displayed by this invention is both vivid and animated.

2. Description of the Prior Art

The major feature of the incoming call alert for conventional cellular phone can be a flash-lighting indicator fixed on top of the antenna, or for separated receiver device the specific flash light of the incoming call alert can be made into a variety of portable articles such as: pen, key chain, animal cartoon decoration, watch, etc. another more advanced method for incoming call alert combining flash light with a small vibrating motor to remind the user of a incoming call without disturbing other people.

From above description we know, the major purpose of conventional incoming call alert is simply to remind the user to answer an incoming phone call without interrupt other people's undertaking operation such as a conference, it would be better if we can display the incoming calling signal in a pictorial or symbolic form onto different displayers, and let the user enjoy the vivid animated full picture display, yet the fancy invention can share the power source with the same cellular phone, thus it overcome the inconvenience of those separated incoming call alert devices that require extra battery set for them to work.

In view of above fact regard to the cellular phone application, the conventional cellular phone still have certain extension space and potential for improvement, after years of constant effort in research for possible improvement, the inventor of this invention has consequently developed and proposed an improved invention pertaining to the subject matter: A displayer-embedded cellular phone battery.

SUMMARY OF THE INVENTION

The objective of this invention is to provide a displayer-embedded cellular phone battery, which can display the pictorial/symbolic messages received from the incoming calls on different displayers.

Another sub-objective of this invention is to provide a displayer-embedded cellular phone battery, which can display the pictorial/symbolic messages preset by the internal controller of this invention, and display on different displayers via the respect display drivers.

Yet another sub-objective of this invention is to provide a displayer-embedded cellular phone battery, which can display pictorial/symbolic messages on displayer via receiver and display driver.

The displayer-embedded cellular phone battery which accomplish the above said purpose of the present invention include:

A receiver, which convert the received frequency signal of cellular phone into a trigger signal, the trigger signal is used for the driving signal of the controller or displayer driver;

A controller, which can convert the picture/text data in its memory into display signal, the signal is then sent to different displayers through the displayer driver.

A display driver, located between the controller and displayer, it consist of driving circuit and voltage raising circuit, works as signal converter to provide driving signal for different displayers.

A displayer, it can be different types of display module for displaying picture and text; and A phone battery, in addition to provide the power for cellular phone set, the phone battery also provide the necessary power for the embedded displayer of this invention, the phone battery is both rechargeable and replaceable;

The displayer-embedded cellular phone battery consist of above mentioned components; can achieve a full picture displaying effect by displaying the internal preset picture/symbol/text on its displayer through the display driver, or it can display the picture/symbol/text through the receiver and the display driver.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
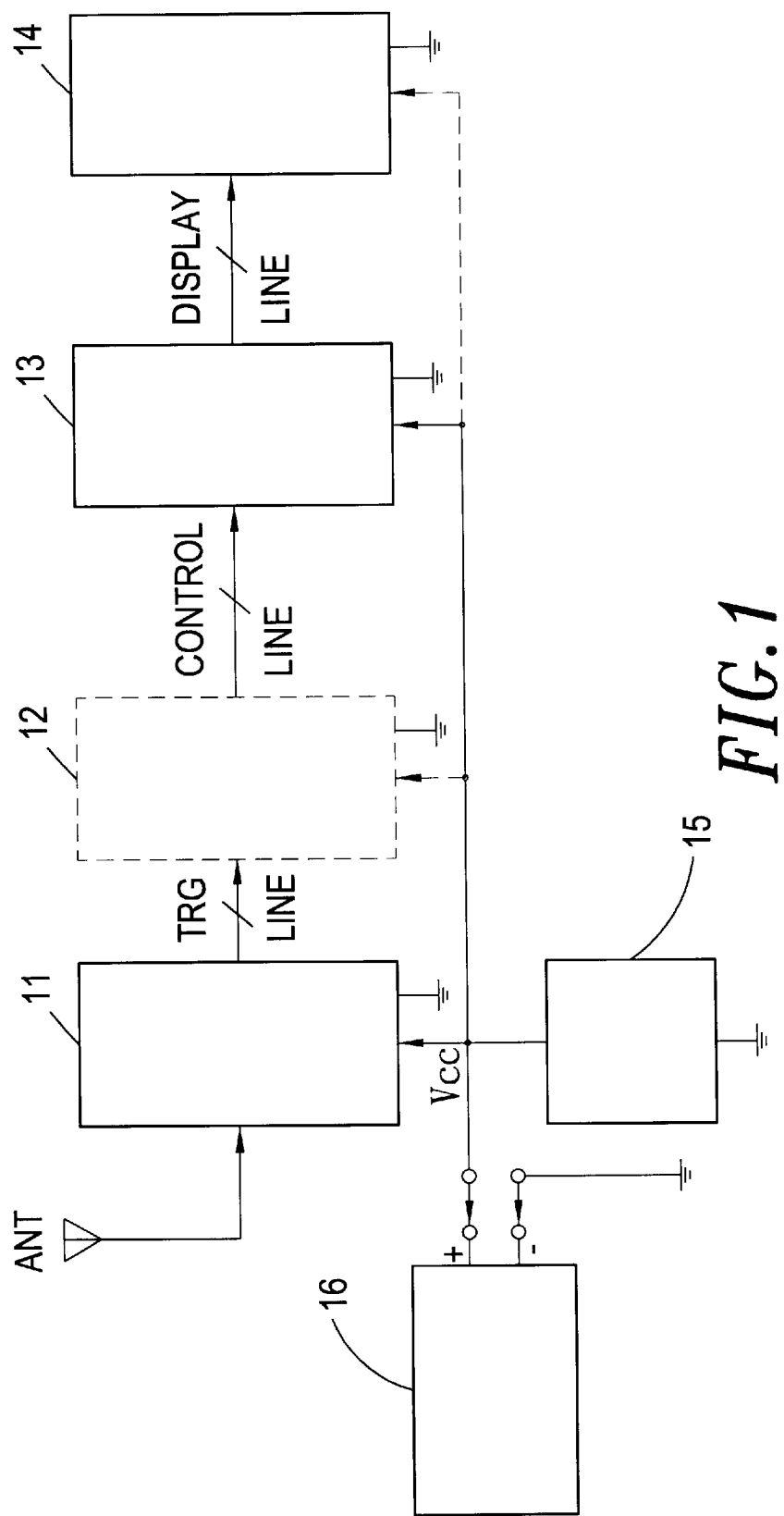
FIG. 1 depicts a circuit block diagram of the displayer-embedded cellular phone battery of the present invention.

Please refer to FIG. 1 for the block diagram that combines the displayer-embedded cellular phone battery of the present invention with a general cellular phone set 16, the displayer-embedded cellular phone battery is consist of a receiver 11, a controller 12, a display driver 13, a displayer 14 and a cellular phone battery 15. Once the antenna transmitting or receiving a signal, the receiver 11 will decoding and output at least one triggering signal to the display controller 12 or to the display driver 13, the signal is used as a condition for the logic control and software computation, so the displayer 14 is able to display the picture/symbol on the matrix LED display screen, which can be a specific character such as a 'V' shape or color/non-color display plate; or a Electro Luminescent displayer, the cellular phone battery 15 provide the power for all circuit blocks, and reserved two (positive and negative) terminals for power input of the cellular phone set 16. As for the implementation and the organization the circuit blocks can be explored and studied from FIG. 2 through FIG. 4.

Figure 2:
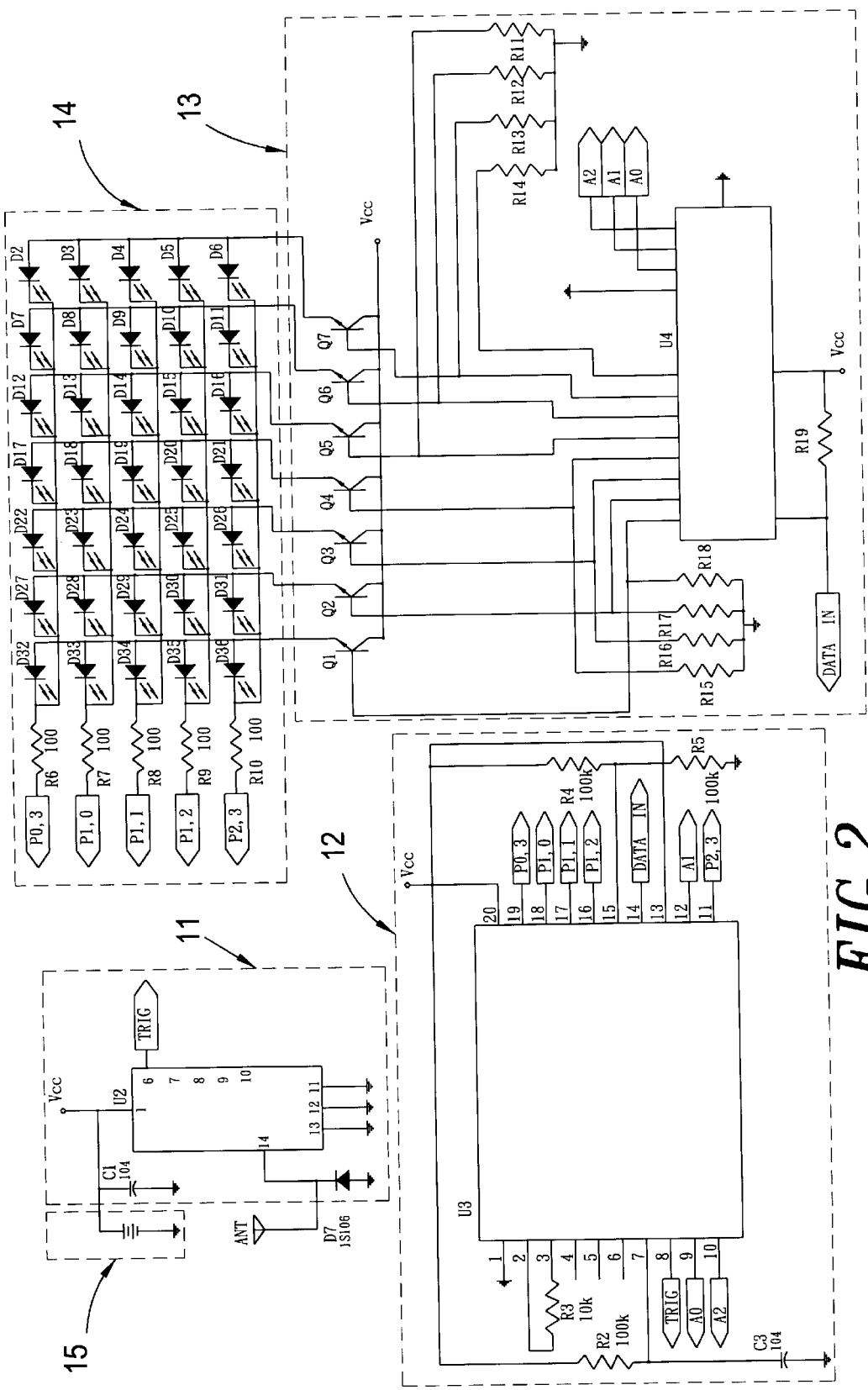
FIG. 2 depicts an implementation circuit block diagram for the matrix LED display device of the cellular phone battery.

Please refer to FIG. 2 for the circuit diagram that displays its message on a matrix LED, the displayer 14 that display different pictures on a block plate consist of 5×7 LEDs. The circuit contains a display controller 12 which process the triggering signal TRIG from the receiver 11, when the antenna ANT receives a cellular phones frequency, through the display driver 13 with multiplexer U4 and transistor Q1~Q7, the controller 12 will display the data set (DATA IN) on the 5×7 LED displayer 14, the power needed for the circuit to work is completely provided by the cellular phone battery 15. In the case when LCD display module is applied, then the LCD display module will include function circuit for the controller 12, the display driver 13 and the displayer 14, the module will receive the triggering signal TRIG direct from the receiver 11, and display picture/symbol/text in color or no-color.

Figure 3:
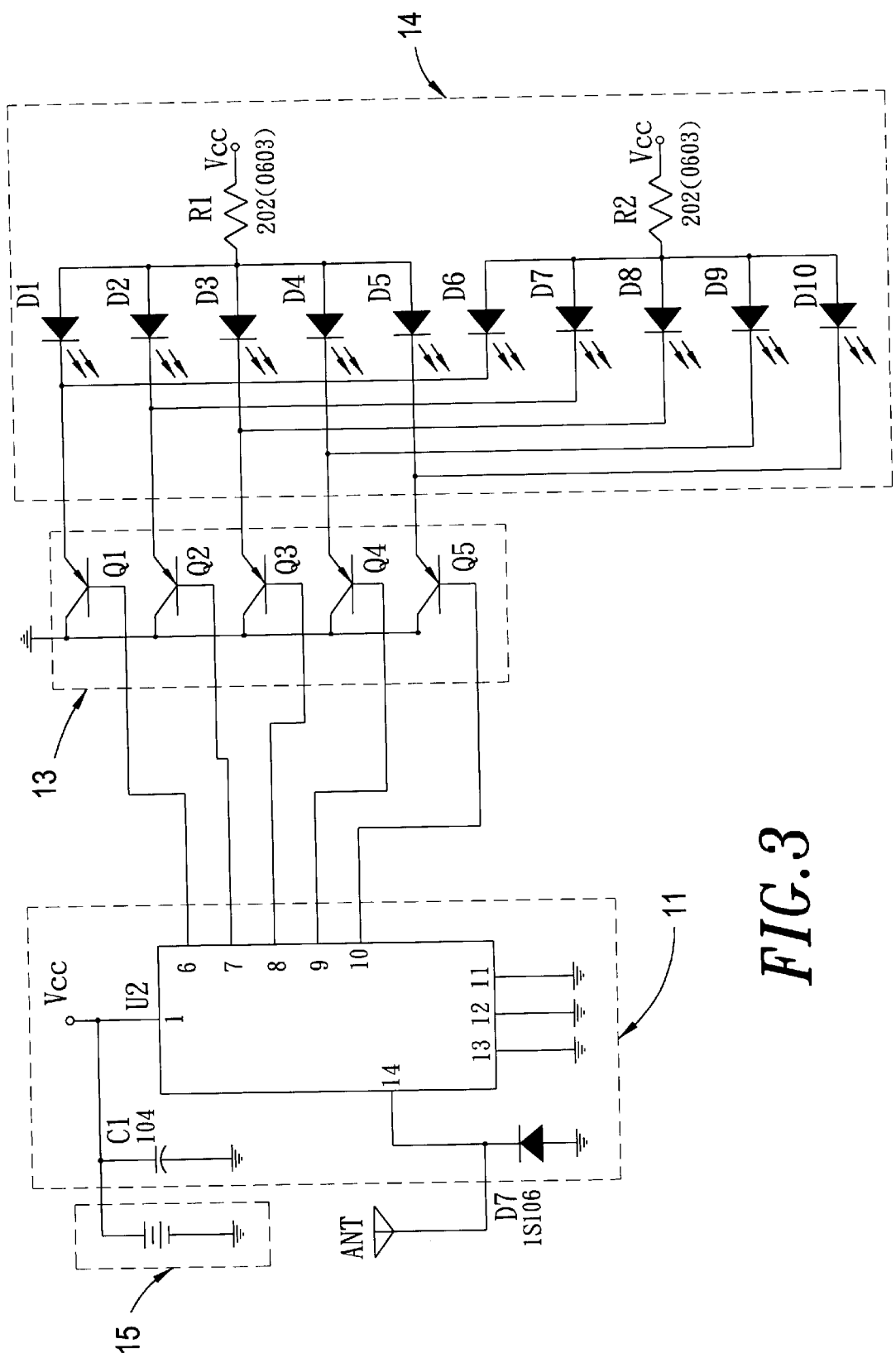
FIG. 3 depicts an implementation circuit block diagram for the matrix LED display device (with specific character/symbol) of the cellular phone battery.

Please refer to FIG. 3 for the circuit diagram that displays a specific character shape, the displayer 14 is a screen composed of LED components that formed into shape such as 'V' or any character of user's interest. The main function of the circuit; when receiving a cellular phone frequency; is to output a control signal to transistor Q1~Q5 of the display driver 13 to lighten up the LED of the displayer 14, the power needed for the circuit to work is completely provided by the cellular phone battery 15.

Figure 4:
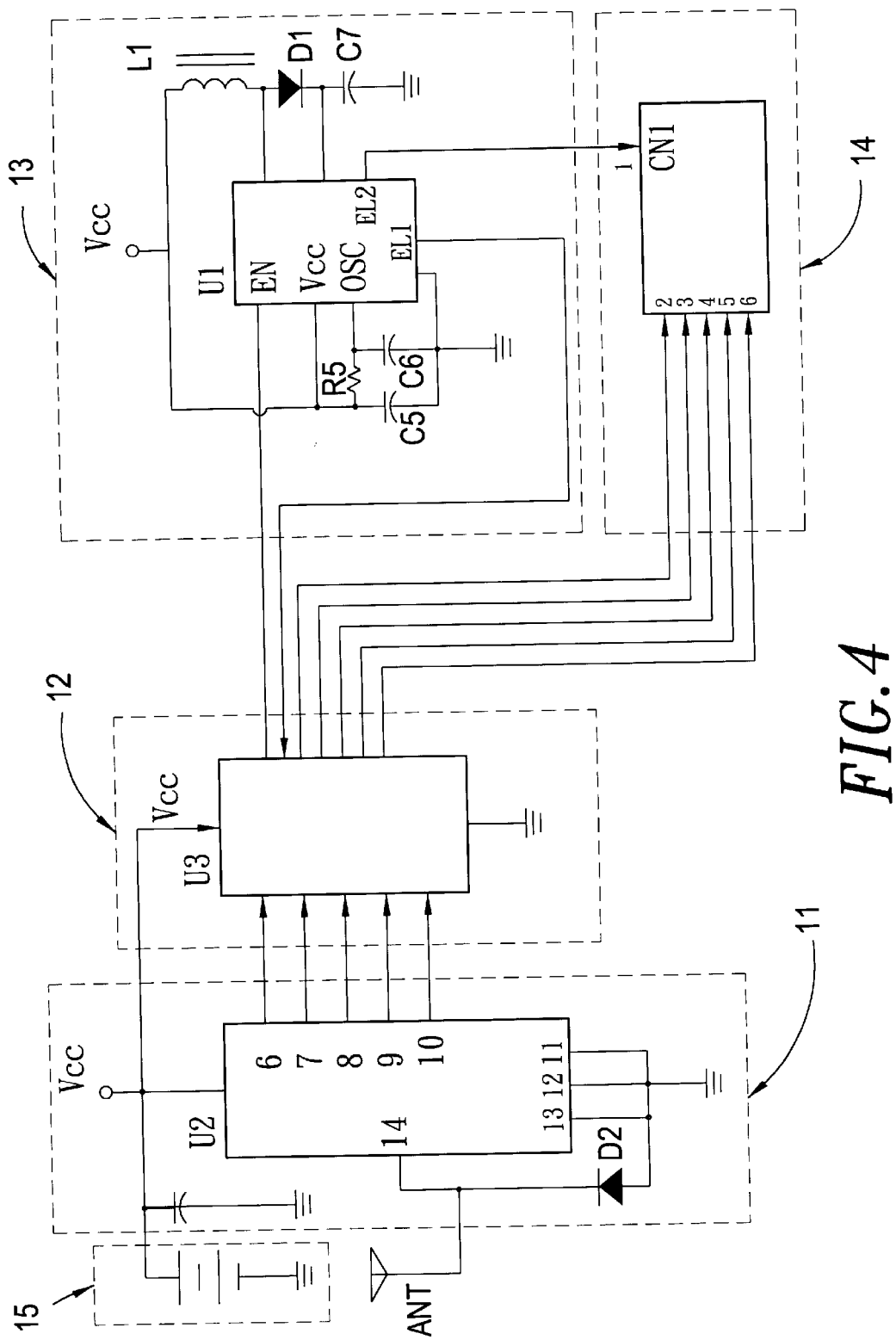
FIG. 4 depicts an implementation circuit block diagram for the Electro Luminescent display device of the cellular phone battery.

Please refer to FIG. 4 for the circuit diagram of an electro luminescent display; the displayer 14 used for picture/symbol/text display contains electro luminescent components. The main function of this circuit is to output a TRIG signal when receiving the cellular phone frequency through the antenna ANT of the receiver 11, the controller 12 convert the signal to activate the display driver 13, drive a voltage raising circuit U1 to produce a high voltage power and then output it to two terminals of EL; one to the electro luminescent display; another to the display controller, the picture/symbol on the displayer 14 can be lighten up by switching through the display controller 12; or the display area of the electro luminescent can be divided into several display blocks, by switching to different display block through the display controller 12, the output voltage of the two EL terminals will then be switched to the control line of the related electro luminescent, causing different colorful change thus let the electro luminescent displayer 11 controlled by the control procedure of the displayer controller 12. To let the users have different choice of pictures for the electro luminescent, the plasma covers with different colorful pictures can be easily replaced like a sticker, so the picture on the electro luminescent will have a vivid look when twinkle; or the electro luminescent can be attached on the back of LCD as a backlight of LCD displayer, the combination of the LCD and the electro luminescent creates a animated looks; or the electro luminescent can be put under the LCD of phone set as a backlight plate, the picture on the backlight plate can be easily replaced by remove the connector from the electro luminescent. The cellular phone battery 13 provides the power consumption of all above-mentioned components.

The displayer-embedded cellular phone battery of the present invention.

This invention provides a displayer-embedded cellular phone battery, when compare with previous conventional techniques, contains following merits:

1. The present invention achieves a fully vivid picture/symbol/text display effect.
2. The present invention can display a picture using its internal preset picture/symbol/text data, or it can display a picture as a function of incoming call alert through the receiver.
3. It overcome the inconvenience of the separated incoming call alert devices that require extra battery set for it to work.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A displayer-embedded cellular phone battery comprising:
    a receiver, which converts a received cellular phone frequency signal into a triggering signal for a driving signal of a display controller or a display driver;
    a controller, which converts a picture/symbol/text data saved in a memory, and provides a display to a displayer through the display driver;
    the display driver, located between the controller and the displayer, working as a display signal converter for a plurality of different displayers;
    the displayer, which can be a variety of display modules, that displays the picture/symbol/text; and
    the cellular phone battery, which is integrated with said displayer, and provides power for a cellular phone set and the embedded displayer, wherein
    said displayer-embedded cellular phone battery is integrated with the body of the cellular phone set and displays the internal preset picture/symbol/text on its displayer through the display driver thus achieving a full picture displaying effect.

2. The displayer-embedded cellular phone battery according to claim 1, wherein said displayer-embedded cellular phone battery can be a combination of the receiver, the display driver, the displayer, and the battery.

3. The displayer-embedded cellular phone battery according to claim 1, wherein said displayer-embedded cellular phone battery can be a combination of the receiver, the display controller, the display driver, the displayer, and a the battery.

4. The displayer-embedded cellular phone battery according to claim 1, wherein said displayer can be a matrix LED display screen, a specific character shape display screen, a color/non-color display module, an electro luminescent displayer plate, electro luminescent displayer plate attached to a back plate of an LCD displayer, or an electro luminescent displayer plate posited below the LCD displayer of the cellular phone set.

5. The displayer-embedded cellular phone battery according to claim 4, wherein said electro luminescent displayer can be made into a single display block or multiple display blocks.

6. The displayer-embedded cellular phone battery according to claim 4, wherein a graphic plastic cover of said electro luminescent displayer can be replaced like a sticker or can easily be removed from a connector of the electro luminescent displayer.

7. The displayer-embedded cellular phone battery according to claim 4, wherein the back plate of said cellular phone battery can be connected to the said displayer and can be separated from the cellular phone battery when replaced for recharging.

* * * * *